United States Patent
Saito et al.

(10) Patent No.: US 7,110,213 B2
(45) Date of Patent: Sep. 19, 2006

(54) POSITIONER FOR POSITIONING HEAD ON A DISK

(75) Inventors: Tomoaki Saito, Kawasaki (JP); Tatsuhiko Kosugi, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 10/899,373

(22) Filed: Jul. 26, 2004

(65) Prior Publication Data
US 2005/0185321 A1 Aug. 25, 2005

(30) Foreign Application Priority Data
Feb. 25, 2004 (JP) .............................. 2004-049301

(51) Int. Cl.
*G11B 5/596* (2006.01)
(52) U.S. Cl. ................................. 360/78.06
(58) Field of Classification Search .................. None
See application file for complete search history.

(56) References Cited

U.S. PATENT DOCUMENTS

| | | | |
|---|---|---|---|
| 4,775,903 A | 10/1988 | Knowles | 360/78 |
| 5,132,855 A | 7/1992 | Waugh et al. | 360/78.07 |
| 5,150,266 A | 9/1992 | Albert | 360/78.04 |
| 5,329,409 A | 7/1994 | Hampshire | 360/77.02 |
| 5,475,545 A | 12/1995 | Hampshire et al. | 360/78.06 |
| 5,859,742 A * | 1/1999 | Takaishi | 360/78.01 |
| 6,166,876 A * | 12/2000 | Liu | 360/78.04 |
| 6,178,060 B1 | 1/2001 | Liu | 360/78.07 |
| 6,449,117 B1 | 9/2002 | Waugh | 360/78.07 |
| 6,545,838 B1 | 4/2003 | Burton | 360/78 |
| 6,757,129 B1 | 6/2004 | Kuroiwa et al. | 360/78.04 |
| 2003/0189784 A1 * | 10/2003 | Galloway | 360/78.06 |

FOREIGN PATENT DOCUMENTS

| | | |
|---|---|---|
| EP | 0 302 683 | 2/1989 |
| EP | 0 774 754 | 5/1997 |
| JP | 9-139032 | 5/1997 |

\* cited by examiner

*Primary Examiner*—Andrew L. Sniezek
(74) *Attorney, Agent, or Firm*—Greer, Burns & Crain, Ltd

(57) ABSTRACT

A drive current output unit outputs a drive current to an actuator, for moving a head to an intended position on a disk. A drive current adjusting unit adjusts the drive current based on a speed of the head, and a distance of a position of the head from the intended position when the drive current is output to the actuator.

6 Claims, 9 Drawing Sheets

FIG.1

DURING ON-TRACK CONTROL

WHEN FF CURRENT IS APPLIED TO VCM

FF POSITION TRACK DATA

DIFFERENTIAL FF POSITION TRACK DATA

POSITIONER FOR POSITIONING HEAD ON A DISK

BACKGROUND OF THE INVENTION

1) Field of the Invention

The present invention relates to a positioner that positions a head swiftly and precisely on an intended position on a disk, with the aid of an actuator.

2) Description of the Related Art

An external storage device of a computer, which may be a disk device, moves a head to an intended track of a rotating disk to read/write data. This method calls for swift and precise movement of the head on the intended track to improve the speed with which data is accessed.

In the disk device disclosed in Japanese Patent Laid Open Publication No. H9-139032, a feed forward current required for moving the head to the intended position surveys the position to which the head is to be moved, and by correcting the position of the head beforehand so that it coincides with the intended position, the head is moved to the intended position swiftly and precisely.

However, every manufactured magnetic disk device has a VCM (Voice Coil Motor), control system, etc., which have unique characteristics and the conventional technology does not have measures to address the variation in the characteristics. Besides, the characteristics of the VCM vary with aging and temperature as well.

Thus, due to the variation in the characteristics of the VCM, control system etc., with the magnetic disk device, it is not easy to determine beforehand the correction value for the characteristics of voice coil motors and control systems to be used for controlling the magnetic head. If a predetermined correction value is still used, while ignoring the effect of aging or temperature variation on the characteristics of the VCM, there is a danger that the settling of the magnetic head may become unstable.

Thus, the issue is one of addressing the unique characteristics of the VCM and the effect of aging and temperature variation on the characteristics of the VCM, as well as moving the magnetic head swiftly and precisely to the intended position.

SUMMARY OF THE INVENTION

It is an object of the invention to at least solve the problems in the conventional technology.

A positioner according to an aspect of the present invention includes a drive current output unit that outputs a drive current to an actuator, for moving a head to an intended position on a disk; and a drive current adjusting unit that adjusts the drive current based on a speed of the head, and a distance of a position of the head from the intended position when the drive current is output to the actuator.

A method according to another aspect of the present invention is for positioning a head on an intended position on a disk. The method includes outputting a drive current to an actuator, for moving the head to the intended position; and adjusting the drive current based on a speed of the head, and a distance of a position of the head from the intended position when the drive current is output to the actuator.

A computer program according to still another aspect of the present invention realizes the method according to the present invention on a computer.

The other objects, features, and advantages of the present invention are specifically set forth in or will become apparent from the following detailed description of the invention when read in conjunction with the accompanying drawings.

DETAILED DESCRIPTION

Exemplary embodiments of a positioner according to the present invention are explained next with reference to the accompanying drawings.

First, the concept of a positioner according to an embodiment of the present invention is explained. The positioner applies a feed forward current (hereinafter "FF current") to a VCM for moving a head to an intended position swiftly, and the VCM in turn moves the head to the intended position as a result of the FF current applied.

After application of the FF current to the VCM, based on the speed of the head, and the distance between the position of the head and the intended position, the positioner moves the head to the intended position, and adjusts the FF current such that the speed of the head retards to zero on reaching the intended position.

Specifically, the FF current is applied to the VCM to perform a seek operation. Upon application of the FF current to the VCM, the positioner presets the position track of the head as an FF position track. The FF position track is used for smooth transition of control of the head to an on-track control, which leads the head to the intended position.

Figure 1:
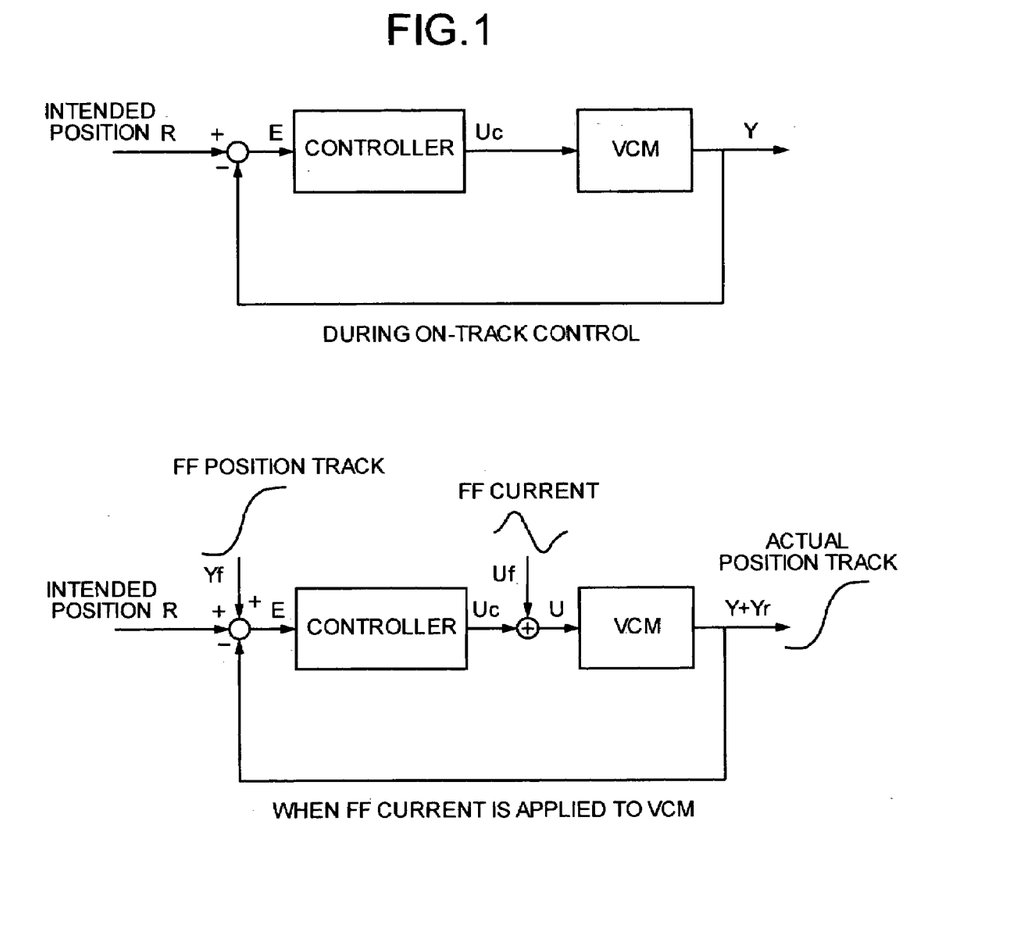
FIG. 1 illustrates an influence of an FF current on a position track.

FIG. 1 illustrates an influence of an FF current on a position track. As shown in FIG. 1, when no seek operation takes place during the on-track control, and no FF current is applied to the VCM, the controller applies a current Uc to the VCM, based on an error E, to lead the head to an intended position R. The error E is a difference between the intended position R and a current position Y.

When the FF current is applied to the VCM to perform the seek operation, an FF current Uf drives the VCM, and the head is moved to a position track Yr. As shown in FIG. 1, the effect of the position track Yr is nullified by an FF position track Yf, which makes a smooth transition of the control of the head to the on-track control, which leads the head to the intended position R.

More specifically, if the effect of the position track Yr is not nullified using FF position track Yf, when transitioning from the seek operation to the feedback control, the position track Yf becomes erroneous and settling is not stabilized.

The positioner brings the FF position track closer to the actual position track based on the difference between the actual position track (hereinafter "actual position track") of the head when the FF current is applied to the VCM and the FF position track.

Figure 2:
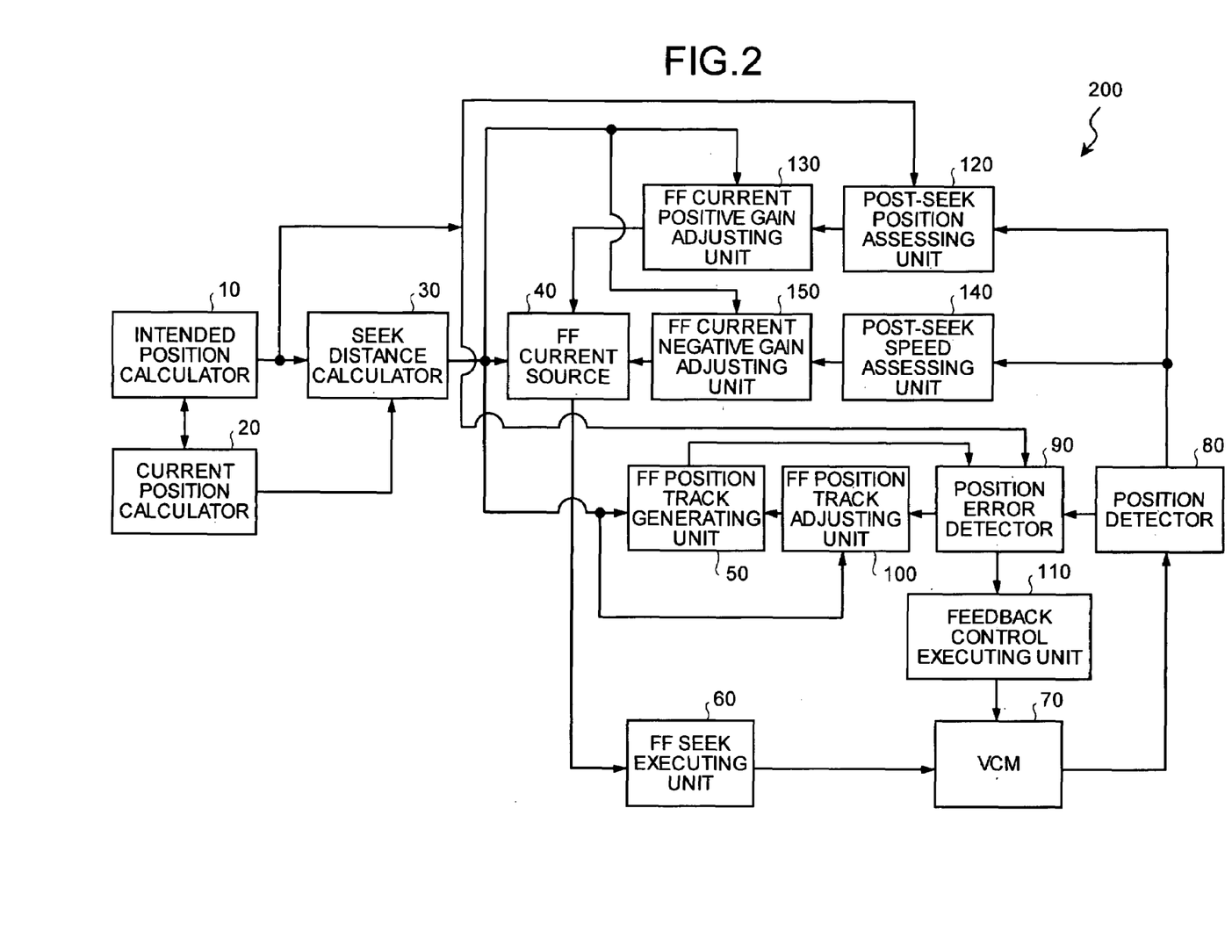
FIG. 2 is a functional block diagram of a positioner according to an embodiment of the present invention.

Next, the structure of the positioner according to an embodiment of the present invention is explained. FIG. 2 is a functional block diagram of the positioner according to an embodiment of the present invention. The positioner 200 includes an intended position calculator 10, a current position calculator 20, a seek distance calculator 30, an FF current source 40, an FF position track generating unit 50, an FF seek executing unit 60, a VCM 70, a position detector 80, a position error detector 90, an FF position track adjusting unit 100, a feedback control executing unit 110, a post-seek position assessing unit 120 that assesses the position of the head on completion of the seek operation, an FF current positive gain adjusting unit 130, a post-seek speed assessing unit 140 that assesses the speed of the head on completion of the seek operation, and an FF current negative gain adjusting unit 150.

The intended position calculator 10 calculates the intended position on receiving the information pertaining to the intended position from an external device (not shown). The intended position calculated is passed on to the seek distance calculator 30, the position error detector 90, and the post-seek position assessing unit 120, all of which are explained later.

The current position calculator 20 calculates the current position of the head using the intended position of a previous seek operation and servo information stored on a recording medium (not shown), and passes on the calculated current position to the seek distance calculator 30.

The seek distance calculator 30 calculates a seek distance based on the intended position received and the current position received. The seek distance indicates the distance of the track on which the head is currently positioned from the track of the intended position. The seek distance calculator 30 passes on the calculated seek distance to the FF current source 40, the FF position track generating unit 50, the FF position track adjusting unit 100, the FF current positive gain adjusting unit 130, and the FF current negative gain adjusting unit 150.

The FF current source 40 receives the seek distance, generates the FF current based on the seek distance received, and then passes the FF current generated, to the FF seek executing unit 60. The generation of FF current is explained next in greater detail. The FF current source 40 maintains short distance FF current data to be used if the received seek distance is below a predetermined value, and long-distance FF current data to be used if the received seek distance is above a predetermined value.

Figure 3:
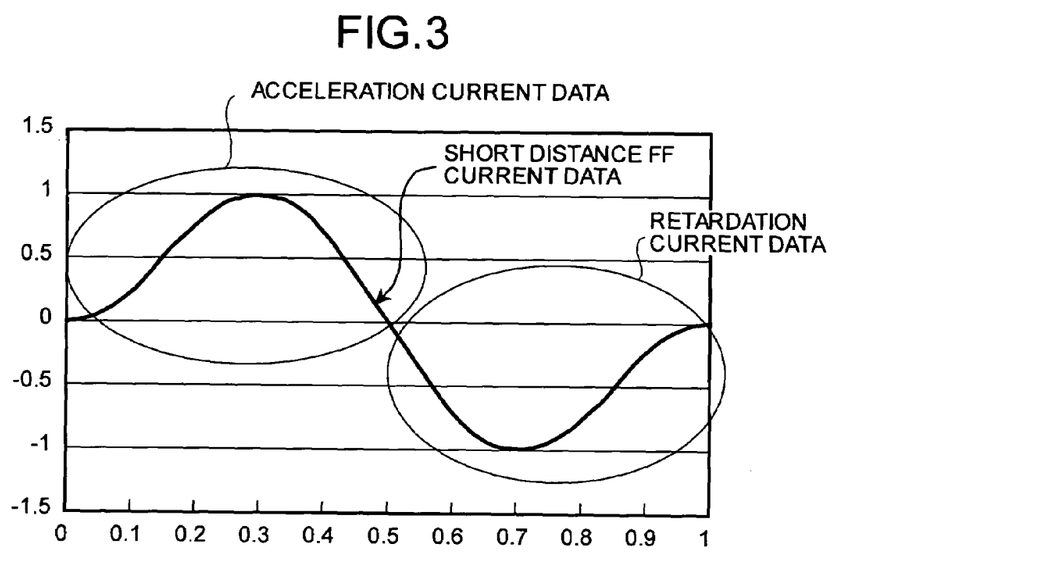
FIG. 3 illustrates short distance FF current data.

FIG. 3 illustrates short distance FF current data. As shown in FIG. 3, if the received seek distance is below a predetermined value, the FF current source 40 generates the FF current using the short distance FF current data. In FIG. 3, the X-axis indicates time and the Y-axis indicates the amount of current. The short distance FF current data represents the FF current data for each seek distance (hereinafter "base short distance FF current data"), which includes acceleration current data and retardation current data. The acceleration current data and the retardation current data respectively accelerate and retard the VCM.

If the received seek distance is 1, the FF current source 40 generates the FF current based on the base short distance FF current data shown in FIG. 3, and passes on the generated FF current to the FF seek executing unit 60. Here, the value 1 as seek distance indicates the distance the head has covered by moving from an Nth track to an (N+1)th track.

If the received seek distance is 2, the FF current source 40 generates the FF current data by multiplying the gain of the seek distance 2 with the base short distance FF current data, generates the FF current based on this FF current data and, passes on the generated FF current to the FF seek executing unit 60.

If the received seek distance is 3 through M−1 (where M indicates a predetermined seek distance that acts a reference value to decide whether to use the short distance FF current data or the long distance FF current data), similar to case of seek distance 2, the FF current source 40 generates the FF current data by multiplying the gain of the seek distance with the base short distance FF current data, generates the FF current based on this FF current data, further generates an FF current, and passes on the generated FF current to the FF seek executing unit 60.

Figure 4:
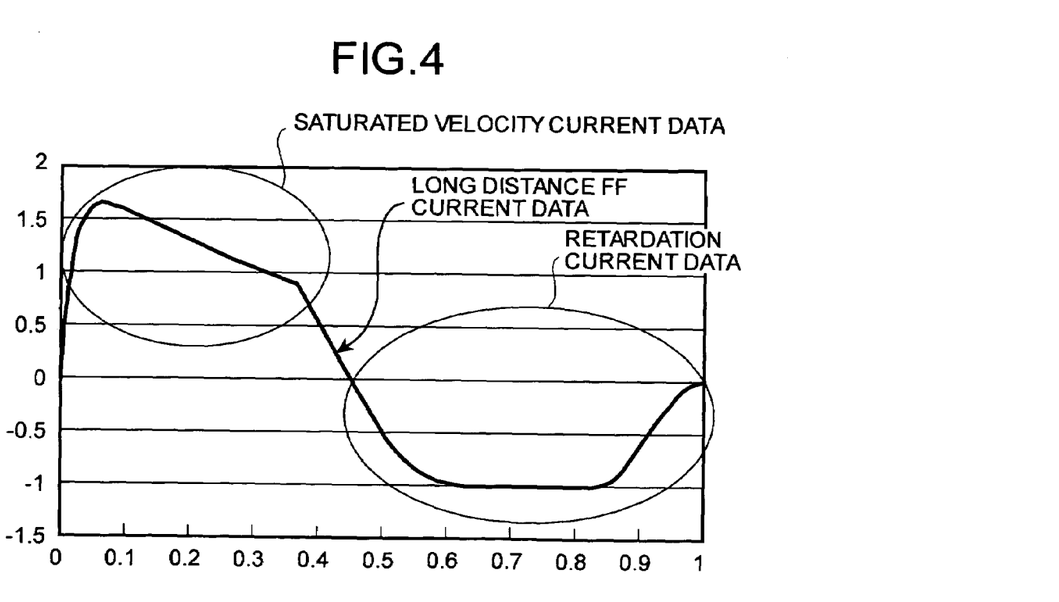
FIG. 4 illustrates long distance FF current data.

If the received seek distance is above the predetermined value M, the long distance FF current data shown in FIG. 4 is used. In FIG. 4, the X-axis indicates time and the Y-axis indicates the amount of current. The long distance FF current data includes saturation velocity current data for driving the VCM by a saturation current, and retardation current data for retarding the VCM. The saturation current is a current that drives the VCM at maximum speed.

The long distance FF current data shown in FIG. 4 indicates the FF current data used if the seek distance is M. Thus, if the received seek distance is the distance from the current track to the Mth track, the FF current is generated based on the long distance FF current data, and the generated FF current will be passed on to FF seek executing unit 60. The long-distance FF current data used when the seek distance is M will hereafter be referred to as the base long distance FF current data.

If the seek distance is M+1, the long distance FF current data is created by multiplying the gain of the seek distance M+1 with the base long distance FF current data, the FF current is generated based on this long distance FF current data, and the generated FF current is passed on to the FF seek executing unit 60.

If the received seek distance is M+2 through L (where L indicates a maximum seek distance), a long distance FF current data is created by multiplying the gain of the seek distance with the base long distance FF current data, the FF current is generated based on this long distance FF current data, and the generated FF current is then passed on to the FF seek executing unit 60.

Figure 5:
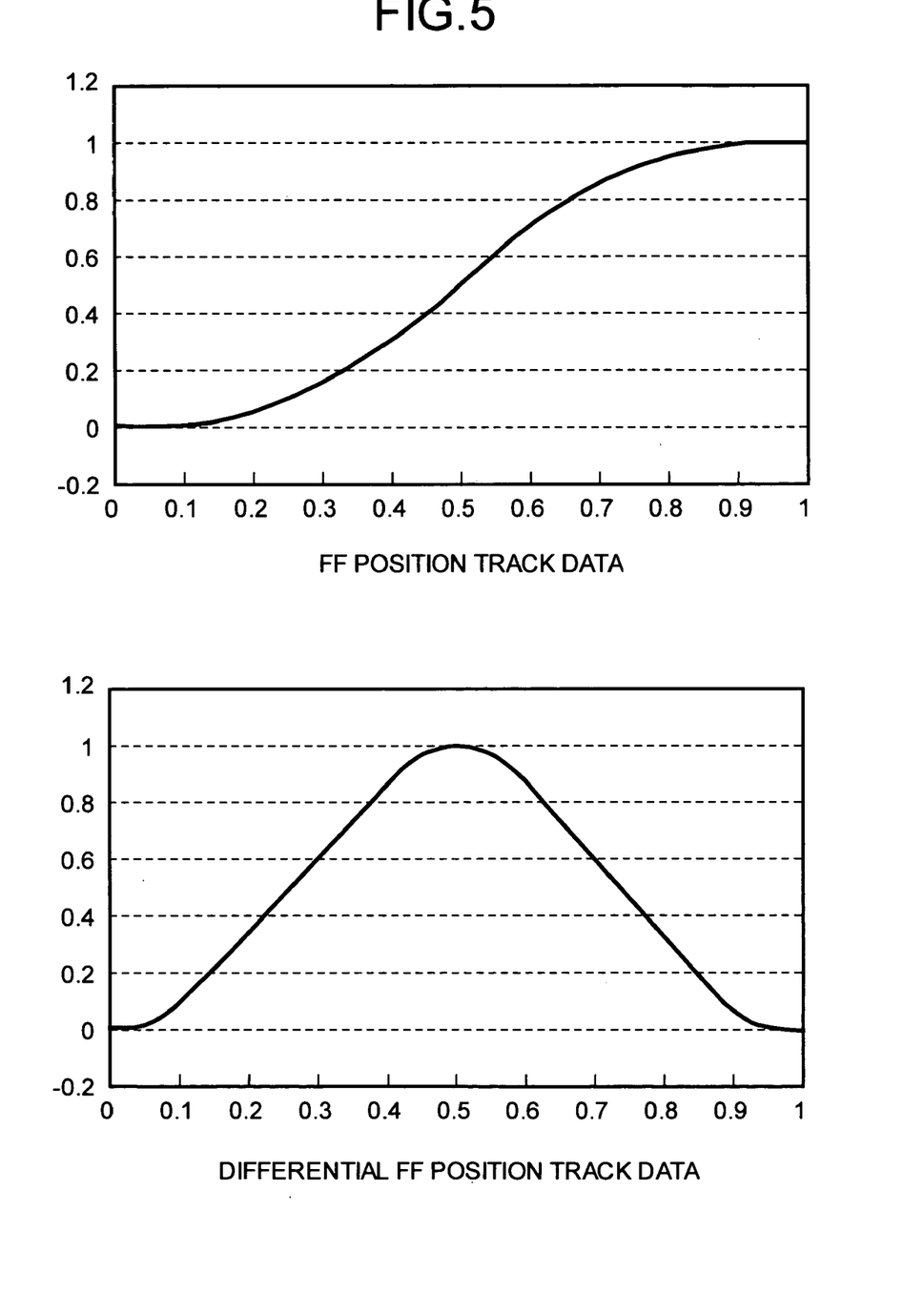
FIG. 5 illustrates FF position track data.

The FF position track generating unit 50 (see FIG. 1) receives the seek distance, generates the FF position track based on the received seek distance, and passes on the generated FF position track to the position error detector 90. The FF position track generation is explained next in greater detail. FIG. 5 illustrates FF position track data. The FF position track generating unit 50 stores the FF position track data for a unit seek distance. In FIG. 5, The X-axis indicates time and the Y-axis indicates the size of a position track. The FF position track data for unit seek distance will hereafter be referred to as base FF position track data.

If the received seek distance is 1, the FF position track generating unit 50 passes on the base FF position track data to the position error detector 90. If the received seek distance is 2, the FF position track generating unit 50 computes the FF position track data by multiplying the gain of the seek distance 2 with the base FF position track data, and passes on the computed FF position track data to the position error detector 90.

Similarly, if seek distance is 3 through L, the FF position track generating unit 50 multiplies the gain of the seek distance with the base FF position track data, and passes on the multiplied FF position track data to the position error detector 90.

The FF position track generating unit 50 stores the base FF position track data in its differential form. Thus, when using the base FF position track data, the differential base FF position track data is integrated to obtain the original form. Thus, storing the base FF position track in the differential form enhances the precision of the base FF position track data.

The FF seek executing unit 60 (see FIG. 1) applies the received FF current to the VCM 70. The FF current drives the VCM and moves the head (not shown) to the intended position.

The position detector 80 detects the actual position track of the head, the current position (the post-seek head position) of the head, and the post-seek head speed. The position detector 80 then passes on the actual position track to the position error detector 90, the current position to the post-seek position assessing unit 120, and the post-seek head speed to the post-seek speed assessing unit 140.

During the on-track control, the position detector 80 sequentially passes on the actual position of the head to the position error detector 90.

The position error detector 90 detects the error between the actual position track and the FF position track for every sampling time, and passes on the detected error to the FF position track adjusting unit 100 as a position track error. Based on the position track error, the position track adjusting unit 100 adjusts the base FF position track data stored in the FF position track generating unit 50.

More specifically, to make the position track error homologous with the base FF position track data, the position track adjusting unit 100 divides the position track error by the gain corresponding to the seek distance. The position track error corresponding to the base FF position track data is hereinafter referred to as a base position track error.

Based on the base position track error, the FF position track adjusting unit 100 creates corrected FF position track data by correcting the base FF position track data stored in the position track generating unit 50 for each sampling time.

The FF position track adjusting unit 100 adjusts the corrected FF position track data to make the final head position in the corrected FF position track data coincide with the intended head position in the actual seek operation. For instance, when the final head position in the corrected FF position track data is one greater with respect to the actual intended position, the corrected FF position control data is decremented by one for each sampling time, thereby making the final head position coincide with the intended position.

The position error detector 90 then passes on the error between the FF position track and the actual position track to the feedback control execution unit 110. However, during the on-track control, the position error detector 90 passes on the error between the current position of the head and the intended position to the feedback control execution unit 110.

Based on the received error, the feedback control execution unit 110 generates the drive current required to lead the head to the intended position, and applies the generated drive current to the VCM 70.

The post-seek position assessing unit 120 receives the current position and the post-seek intended head position, assesses whether the position of the head has crossed the intended position, and passes on the assessment result to the FF current positive gain adjusting unit 130.

Figure 6:
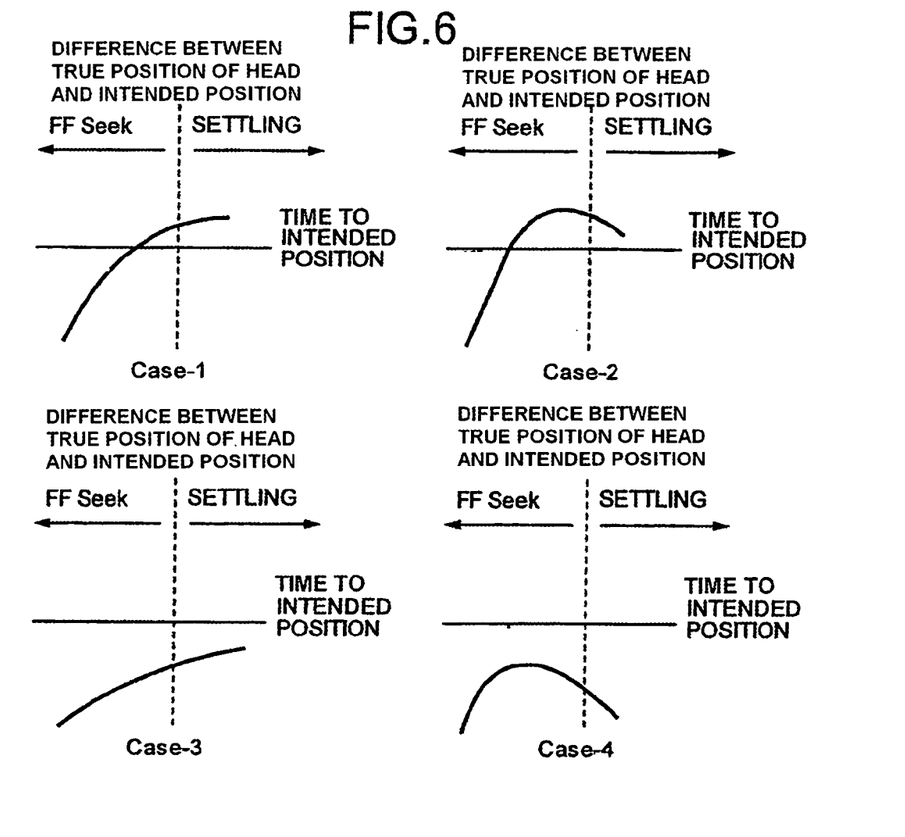
FIG. 6 illustrates a relation between a position and a speed of a head when the FF current is applied to a VCM.

FIG. 6 illustrates a relation between the position and the speed of the head when the FF current is applied to the VCM. The vertical dotted line represents the instant when the FF current stops flowing in the VCM. The horizontal axis indicates the intended position. In FIG. 6, Case-1 is an example illustrating an instance of the head crossing the intended position and the speed of the head being positive at the instant when the FF current stops flowing in the VCM. Case-2 is an example illustrating an instance of the head crossing the intended position and the speed of the head being negative at the instant when the FF current stops flowing in the VCM.

Case-3 is an example illustrating an instance of the head falling short of the intended position and the speed of the head being positive at the instant when the FF current stops flowing in the VCM. Case-4 is an example illustrating an instance of the head falling short of the intended position and the speed of the head being negative at the instant when the FF current stops flowing in the VCM.

Accordingly, in Case-1 and Case-2 the post-seek position assessing unit 120 assesses that the position of the head has crossed the intended position, and in Case-3 and Case-4, the post-seek position assessing unit 120 assesses that the position of the head has fallen short of the intended position. If the position of the head coincides with the intended position, the post-seek position assessing unit 120 notifies the fact to the FF current positive gain adjusting unit 130.

The FF current positive gain adjusting unit 130 (see FIG. 1) receives the seek distance from the seek distance calculator 30, and the assessment result from the post-seek position assessing unit 120. Based on this assessment result received, the FF current positive gain adjusting unit 130 adjusts either the acceleration current data of the base short distance FF current data or the saturation velocity current data of the base long distance FF current data stored in the FF current source 40.

The operation involving the adjustment of the FF current data is explained next. If the seek distance is below the predetermined value M, the FF current positive gain adjusting unit 130 assesses that the acceleration current data of the base short distance FF current data needs to be adjusted. If seek distance is above the predetermined value M, the FF current positive gain adjusting unit 130 assesses that the saturation velocity current data of the base long distance FF current data needs to be adjusted.

The FF current positive gain adjusting unit 130 adjusts the base short distance FF current data by correcting the acceleration current data, based on the assessment result of the post-seek position assessing unit 120.

In other words, if the post-seek position assessing unit 120 assesses that the head position has crossed the intended position, the FF current positive gain adjusting unit 130 reduces the acceleration current data by a predetermined proportion, thereby tempering the acceleration of the VCM. Thus, the head is prevented from crossing the intended position.

On the other hand, if the post-seek position assessing unit 120 assesses that the head position is short of the intended position, the FF current positive gain adjusting unit 130 steps up the acceleration current data by a predetermined proportion, thereby accentuating the acceleration of the VCM. Thus, the head is made to reach the intended position. If the head position coincides with the intended position, the FF current positive gain adjusting unit 130 does not adjust the FF current data.

The FF current positive gain adjusting unit 130 adjusts the base long distance FF current data by adjusting the saturation velocity current data based on the assessment result of the post-seek position assessing unit 120.

In other words, if the post-seek position assessing unit 120 assesses that the head position has crossed the intended position, the FF current positive gain adjusting unit 130 shortens a saturation period of the saturation velocity current data, by a predetermined period. Consequently, the VCM can be retarded quickly, thereby preventing the head from crossing the intended position.

If the post-seek position assessing unit 120 assesses that the head position is short of the intended position, the FF current positive gain adjusting unit 130 prolongs the saturation period of the saturation velocity current data, by a predetermined period. Consequently, retardation period of the VCM is delayed, and the head reaches the intended position.

The post-seek speed assessing unit 140 receives the post-seek head speed, assesses whether the speed of the head is positive or negative, and notifies the finding to the FF current negative gain adjusting unit 150. If the post-seek head speed is zero, the post-seek speed assessing unit 140 notifies the fact to the FF current negative gain adjusting unit 150.

For instance, in FIG. 6, the post-seek speed assessing unit 140 assesses that the speed of the head is positive in Case-1 and Case-3, and negative in Case-2 and Case-4.

The FF current negative gain adjusting unit 150 receives the seek distance from the seek distance calculator 30, and the finding from the post-seek speed assessing unit 140. Based on the received data, the FF current negative gain adjusting unit 150 adjusts either the retardation current data of the base short distance FF current data or the retardation current data of the base long distance FF current data stored in the FF current source 40.

The operation involving the adjustment of the retardation current data is explained next. If the seek distance is below the predetermined value M, the FF current negative gain adjusting unit 150 assesses that the retardation current data of the base short distance FF current data needs to be adjusted., and if the seek distance is above the predetermined value M, the FF current negative gain adjusting unit 150 assesses that the retardation current data of base long distance FF current data needs to be adjusted.

Consequently, if the seek distance is below the predetermined value M, the FF current negative gain adjusting unit 150 adjusts the base short distance FF current data. If the speed of the head is positive according to the assessment result of the post-seek speed assessing unit 140, then the FF current negative gain adjusting unit 150 increases the retardation current data by the predetermined proportion.

If the speed of the head is negative according to the assessment result of the post-seek speed assessing unit 140, then the FF current negative gain adjusting unit 150 decreases the retardation current data by the predetermined proportion.

When the seek distance is above the predetermined value M, the FF current negative gain adjusting unit 150 adjusts the retardation current data of the base long distance FF current data. However, the adjustment process of the retardation current data is same as that of the base short distance FF current data, and hence, the explanation thereof is omitted.

Figure 7:
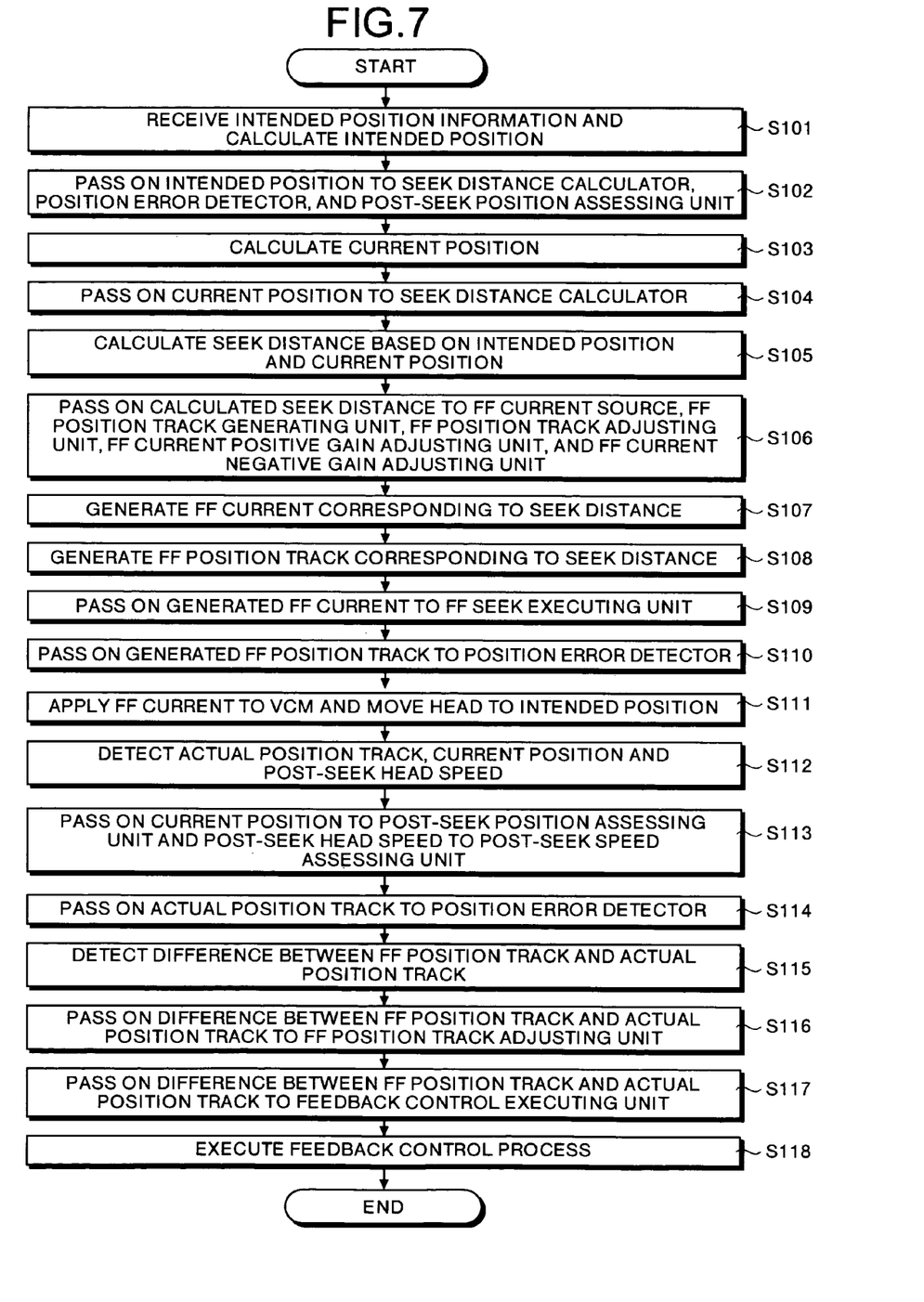
FIG. 7 is a flowchart of a seek operation of the positioner.

Next, the seek operation process of the positioner according to the present embodiment is explained. FIG. 7 is a flow chart of the seek operation of the positioner. As shown in FIG. 7, the intended position calculator 10 receives the intended position information and calculates the intended position (Step S101). The intended position calculator 10 then passes on the calculated intended position to the post-seek position assessing unit 120, the seek distance calculator 30, and the position error detector 90 (Step S102).

The current position calculator 20 calculates the current position of the head (Step S103), and passes on the calculated current position of the head to the seek distance calculator 30 (Step S104). The seek distance calculator 30 calculates the seek distance based on the intended position and the current position (Step S105).

The seek distance calculator 30 passes on the calculated seek distance to the FF current source 40, the FF position track generating unit 50, the FF position track adjusting unit 100, the FF current positive gain adjusting unit 130, and the FF current negative gain adjusting unit 150 (Step S106).

The FF current source 40 generates the FF current corresponding to the seek distance (Step S107), and the FF position track generating unit 50 generates the FF position track corresponding to the seek distance (Step S108).

The FF current source 40 passes on the generated FF current to the FF seek executing unit 60 (Step S109), and the FF position track generating unit 50 passes on the generated FF position track to the position error detector 90 (Step S110).

The FF seek executing unit 60 applies the FF current to the VCM, and moves the head to the intended position (Step S111), and the position detector 80 detects the actual position track, the current position, and the post-seek speed of the head (Step S112).

The position detector 80 passes on the current position to the post-seek position assessing unit 120, the speed of the head to the post-seek speed assessing unit 140 (Step S113), and the actual position track to the position error detector 90 (Step S114).

The position error detector 90 detects the difference between the FF position track and the actual position track (Step S115), and passes on the difference to the FF position track adjusting unit 100 (Step S116). The position error detector 90 passes on the difference between the FF position track and the actual position track to the feedback control executing unit 110 (Step S117), thereby executing the feedback control process (Step S118).

Figure 8:
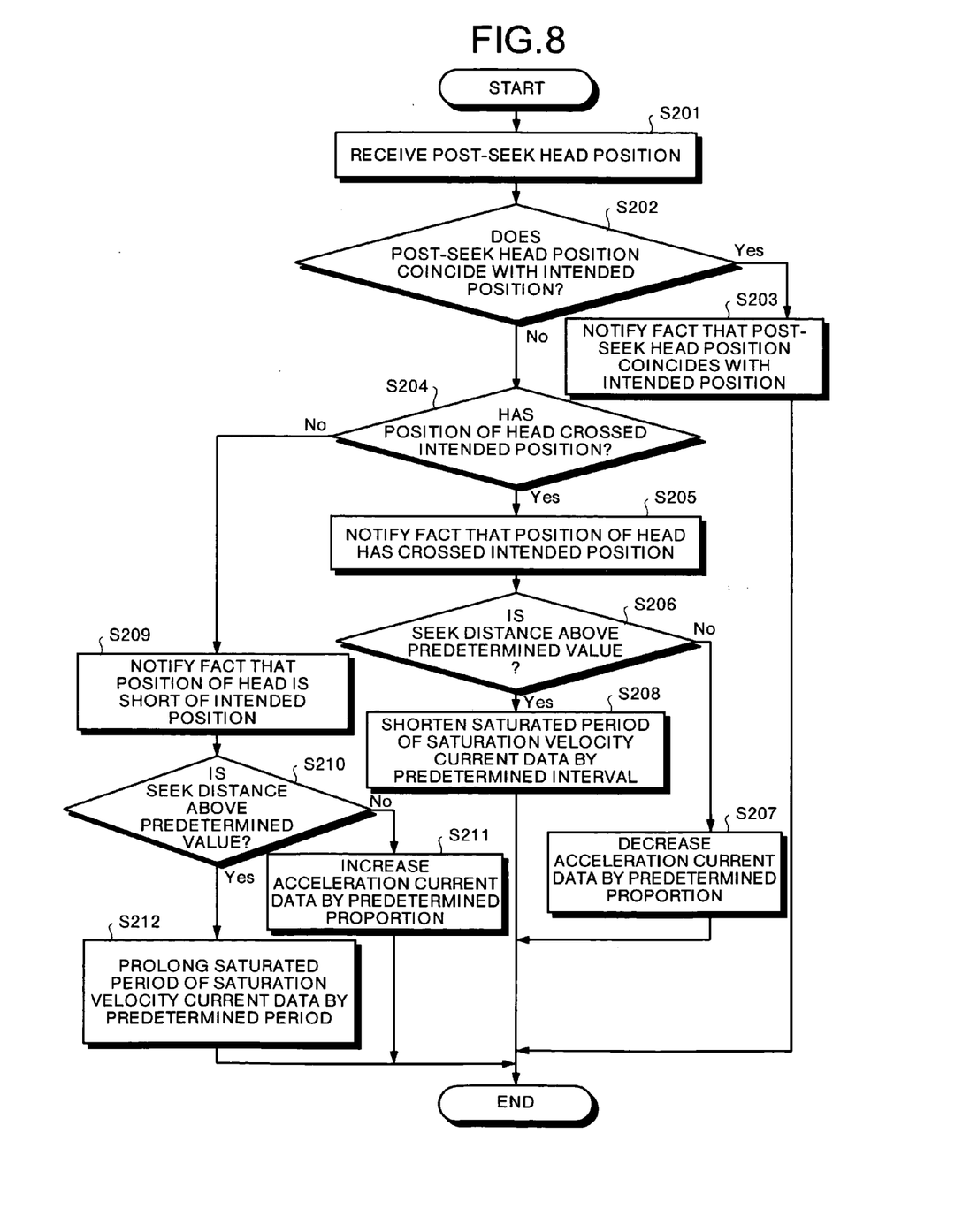
FIG. 8 is a flowchart of an adjustment of acceleration current data or saturation velocity current data.

An adjustment process of the acceleration current data and the saturation velocity current data is explained next. FIG. 8 is a flow chart of the adjustment of the acceleration current data or the saturation velocity current data. As shown in FIG. 8, the post-seek position assessing unit 120 receives the post-seek head position (Step S201), and assesses whether the post-seek head position and the intended position coincide (Step S202).

If the post-seek head position coincides with the intended position (Yes at Step S202), the post-seek position assessing unit 120 notifies the fact to the FF current positive gain adjusting unit 130 (Step S203). However, if the position of the head does not coincide with the intended position (No at Step S202), the post-seek position assessing unit 120 assesses whether the position of the head has crossed the intended position (Step S204).

If the position of the head crosses the intended position (Yes at Step S204), the post-seek position assessing unit 120 notifies the fact to the FF current positive gain adjusting unit 130 (Step S205).

The FF current positive gain adjusting unit 130 assesses whether the seek distance is above the predetermined value (Step S206). If the seek distance is below the predetermined value (No at Step S206), the FF current positive gain adjusting unit 130 decreases the acceleration current data of the base short distance FF current data stored in the FF current source 40, by the predetermined proportion (Step S207).

If seek distance is above the predetermined value (Yes at Step S206), the saturated period of the saturation velocity current data is shortened by a predetermined period (Step S208).

If the position of the head has not crossed the intended position (No at Step S204), the post-seek position assessing unit 120 notifies the FF current positive gain adjusting unit 130 that the head falls short of the intended position (Step S209).

The FF current positive gain adjusting unit 130 assesses whether the seek distance is above the predetermined value (Step S210). If the seek distance is below the predetermined value (No at Step S210), the FF current positive gain adjusting unit 130 increases the acceleration current data of the base short distance FF current data, by a predetermined proportion (Step S211).

If the seek distance is above the predetermined value (Yes at Step S210), The FF current positive gain adjusting unit 130 prolongs the saturated period of saturation velocity current data, by a predetermined period (Step S212).

Thus, the post-seek position assessing unit 120 assesses whether the position of the head has crossed the intended position, and the FF current positive gain adjusting unit 130 adjusts the saturated period of the acceleration current data or the saturation velocity current data. Consequently, the position of the head is brought closer to the post-seek intended head position.

Figure 9:
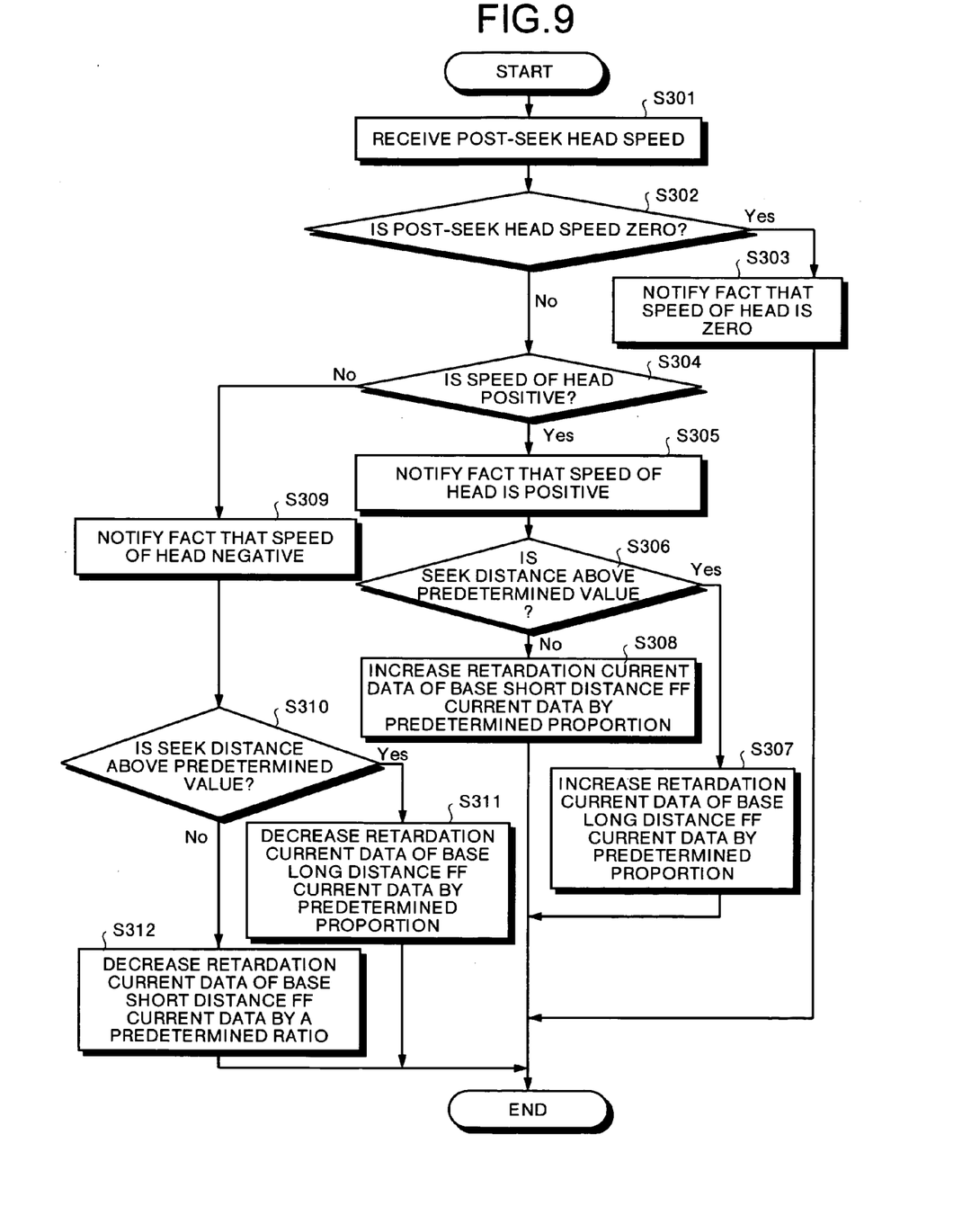
FIG. 9 is a flow chart of an adjustment of retardation current data.

An adjustment of retardation current data is explained next. FIG. 9 is a flow chart of the adjustment of the retardation current data. As shown in FIG. 9, the post-seek speed assessing unit 140 receives the post-seek head speed (Step S301), and assesses whether the post-seek head speed is zero (Step S302).

If the post-seek head speed is zero (Yes at Step S302), the post-seek speed assessing unit 140 notifies the fact to the FF current negative gain adjusting unit 150 (Step S303).

If the speed of the head is not zero (No at Step S302), the post-seek speed assessing unit 140 assesses whether the post-seek head speed is positive (Step S304). If the speed of the head is positive (Yes at Step S304), the post-seek speed assessing unit 140 notifies the fact to the FF current negative gain adjusting unit 150 (Step S305). The FF current negative gain adjusting unit 150 assesses whether the seek distance is above the predetermined value (Step S306).

If the seek distance is above the predetermined value (Yes at Step S306), the FF current negative gain adjusting unit 150 increases the retardation current data of the base long distance FF current data by a predetermined proportion (Step S307). However, if the seek distance is below the predetermined value (No at Step S306), the FF current negative gain adjusting unit 150 increases the retardation current data of the base short distance FF current data by a predetermined proportion (Step S308).

If the speed of the head is negative (No at Step S304), the post-seek speed assessing unit 140 notifies the fact to the FF current negative gain adjusting unit 150 (Step S309), and the FF current negative gain adjusting unit 150 assesses whether the seek distance is above the predetermined value (Step S310).

If the seek distance is above the predetermined value (Yes at Step S310), the FF current negative gain adjusting unit 150 decreases the retardation current data of the base long distance FF current data by a predetermined proportion (Step S311). However, if the seek distance is below the predetermined value (No at Step S310), the FF current negative gain adjusting unit 150 decreases the retardation current data of the base short distance FF current data by a predetermined proportion (Step S312).

Thus, the post-seek speed assessing unit 140 assesses whether the post-seek head speed is positive or negative, and the FF current negative gain adjusting unit 150 adjusts the retardation current data based on the assessment result of the post-seek speed assessing unit 140. Consequently, seek operation with respect to the intended position is stable.

Figure 10:
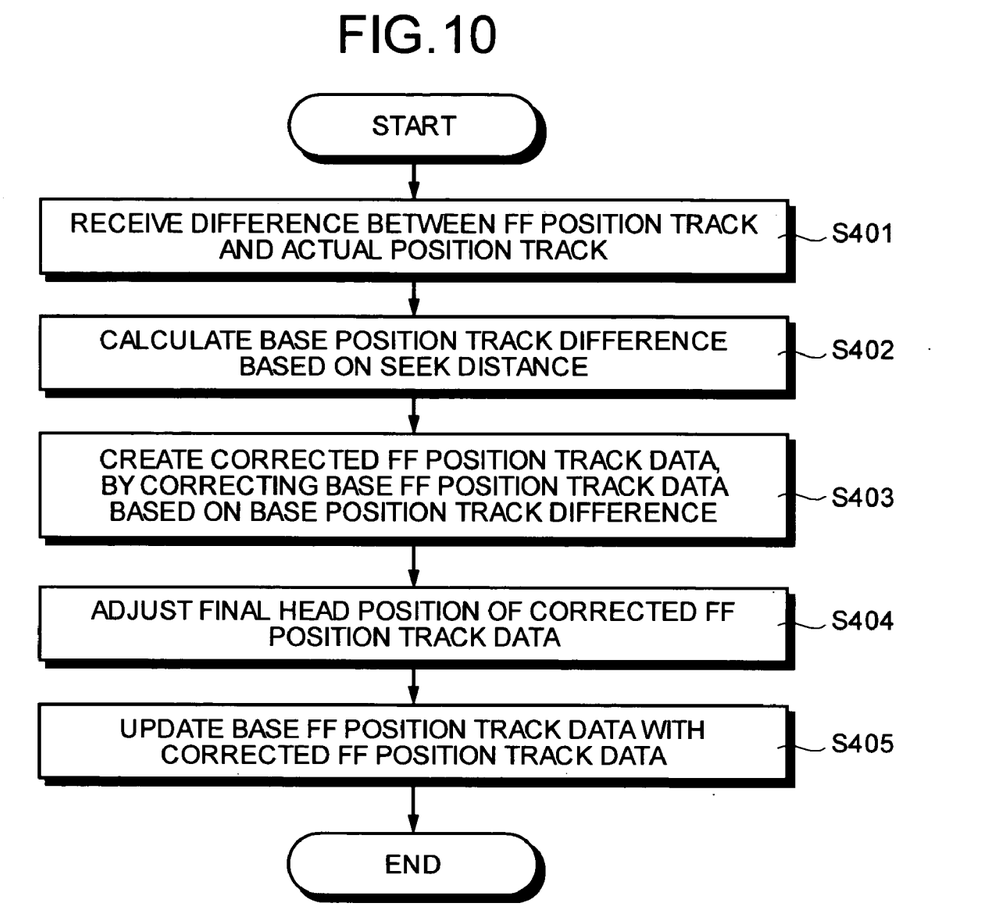
FIG. 10 is a flowchart of an adjustment of an FF position track.

An adjustment of the FF position track is explained next. FIG. 10 is a flow chart of the adjustment of the FF position track. The FF position track adjusting unit 100 carries out the adjustment process of the FF position track, based on the error detected by the position error detector 90.

As shown in FIG. 10, the FF position track adjusting unit 100 receives the difference between the FF position track and the actual position track (Step S401), and calculates the base position track difference based on the seek distance (Step S402).

The FF position track adjusting unit 100 creates corrected FF position track data by correcting the base FF position track data based on the base position track difference (Step S403), adjusts the final head position of the corrected FF position track data (Step S404), and updates the base FF position track data with the corrected FF position track data (Step S405).

Thus, the FF current positive gain adjusting unit 130 adjusts the acceleration current data or the saturation velocity current data based on the assessment result of the post-seek position assessing unit 120, and the FF current negative gain adjusting unit 150 adjusts the retardation current data based on the assessment result of the post-seek speed assessing unit 140. Consequently, the positioner according to the present invention moves the head to the intended position swiftly and precisely, without being influenced by the unique characteristics of the different VCMs.

Moreover, the FF position track adjusting unit 100 corrects, based on the difference between the FF position track and the actual position track, the FF position track data which is stored by the FF position track generating unit 50, and adjusts the final head position so as to coincide with the intended position. Consequently, the influence of noise, etc. is suppressed, and the head is accurately led to the intended position.

Thus, in the positioner according to of the present invention, a drive current output unit outputs a drive current to an actuator, for moving a head to an intended position on a disk. A drive current adjusting unit adjusts the drive current based on a speed of the head, and a distance of a position of the head from the intended position when the drive current is output to the actuator.

Moreover, the drive current includes an acceleration current that accelerates the actuator, and a retardation current that retards the actuator. The drive current adjusting unit decreases the acceleration current output to the actuator by a predetermined proportion if the head crosses the intended position, and increases the acceleration current output to the actuator by a predetermined proportion if the head falls short of the intended position.

Furthermore, the drive current includes an acceleration current that accelerates the actuator, and a retardation current that retards the actuator. The drive current adjusting unit increases the retardation current output to the actuator by a predetermined proportion if the speed of the head at the intended position is positive, and decreases the retardation current output to the actuator by a predetermined proportion if the speed of the head at the intended position is negative.

Moreover, a position track storing unit stores a position track, that leads to the intended position of the head, as an estimated position track, where the position track is estimated when the drive current is output to the actuator. A position track adjusting unit makes adjustments so that a final position of a corrected position track coincides with the intended position, where the position track adjusting unit generates the corrected position track by correcting the estimated position track based on an actual position track that is covered by the head before reaching the intended position. A control unit controls the actuator in such a way that the head is led to the intended position, using the corrected position track adjusted by the position track adjusting unit.

Furthermore, the drive current output unit outputs the drive current that includes a saturation velocity current and a retardation current, if a distance between the position of the head and the intended position is more than a threshold value, where the saturation velocity current drives the actuator with a saturation velocity, and the retardation current retards the actuator. The drive current adjusting unit adjusts the drive current by shortening a driving period by a predetermined amount if the head crosses the intended position, and by prolonging the driving period by a predetermined amount if the head falls short of the intended position, where the driving period is a duration for which the drive current drives the actuator.

According to the present invention, the head can be precisely moved to the intended position at the time of seek operation. Moreover, the present invention also adapts well to the variations in the characteristics unique to the actuator, or the effect of aging and temperature variation.

Furthermore, the influence of noise is suppressed and the head can be led to the intended position precisely.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A positioner that performs a seek operation of positioning a head attached to an actuator at an intended position on a disk, the positioner comprising:
    a drive current calculating unit that calculates a drive current which when applied to the actuator causes the actuator to move the head to the intended position;
    a drive current adjusting unit that adjusts the calculated drive current based on a speed of the head and a difference between a true position of the head and an intended position during a previous seek operation; and
    an actuator moving unit that moves the actuator based on the adjusted drive current so as to move the head to the intended position wherein:
    the drive current includes an acceleration current that accelerates the actuator, and a retardation current that retards the actuator, and
    the drive current adjusting unit decreases a proportion of the acceleration current in the drive current if the head had crossed the intended position in the previous seek operation, and increases a proportion of the acceleration current in the drive current if the head had fallen short of the intended position in the previous seek operation.

2. A positioner that performs a seek operation of positioning a head attached to an actuator at an intended position on a disk, the positioner comprising:
    a drive current calculating unit that calculates a drive current which when applied to the actuator causes the actuator to move the head to the intended position;
    a drive current adjusting unit that adjusts the calculated drive current based on a speed of the head and a difference between a true position of the head and an intended position during a previous seek operation; and
    an actuator moving unit that moves the actuator based on the adjusted drive current so as to move the head to the intended position wherein:
    the drive current includes an acceleration current that accelerates the actuator, and a retardation current that retards the actuator, and
    the drive current adjusting unit increases a proportion of the retardation current in the drive current if the velocity of the head at the intended position was positive in the previous seek operation, and decreases a proportion of the retardation current in the drive current if the velocity of the head at the intended position was negative in the previous seek operation, wherein positive velocity is a velocity at a first seek operation and negative velocity is a velocity with an opposite direction to positive velocity.

3. A positioner that performs a seek operation of positioning a head attached to an actuator at an intended position on a disk, the positioner comprising:
    a drive current calculating unit that calculates a drive current which when applied to the actuator causes the actuator to move the head to the intended position;
    a drive current adjusting unit that adjusts the calculated drive current based on a speed of the head and a difference between a true position of the head and an intended position during a previous seek operation; and
    an actuator moving unit that moves the actuator based on the adjusted drive current so as to move the head to the intended position wherein:
    the drive current includes a saturation velocity current that drives the actuator with a saturation velocity, and a retardation current that retards the actuator, and
    if the difference between the true position of the head and the intended position during the previous seek operation is greater than a threshold value, the drive current adjusting unit adjusts the calculated drive current so as to shorten a driving period by a predetermined duration for driving the actuator with the saturation velocity if the head had crossed the intended position in the previous seek operation, and adjusts the calculated drive current so as to prolong the driving period by a predetermined duration for driving the actuator with the saturation velocity current if the head had fallen short of the intended position in the previous seek operation, wherein the driving period is a duration for which the drive current drives the actuator.

4. A method for positioning a head attached to an actuator at an intended position on a disk, comprising:
    calculating a drive current, which when applied to the actuator, causes the actuator to move the head to the intended position;
    adjusting the calculated drive current based on a speed of the head, and a difference between a true position of the head and the intended position during a previous seek operation; and
    moving the actuator based on the adjusted drive current so as to move the head to the intended position wherein:

the drive current includes an acceleration current that accelerates the actuator, and a retardation current that retards the actuator, and the adjusting includes decreasing a proportion of the acceleration current in the drive current if the head had crossed the intended position in the previous seek operation, and increasing a proportion of the acceleration current in the drive current if the head had fallen short of the intended position in the previous seek operation.

5. A method for positioning a head attached to an actuator at an intended position on a disk, comprising:

calculating a drive current, which when applied to the actuator, causes the actuator to move the head to the intended position;

adjusting the calculated drive current based on a speed of the head, and a difference between a true position of the head and the intended position during a previous seek operation; and moving the actuator based on the adjusted drive current so as to move the head to the intended position wherein the drive current includes an acceleration current that accelerates the actuator, and a retardation current that retards the actuator, and the adjusting includes increasing a proportion of the retardation current in the drive current if the velocity of the head at the intended position was positive in the previous seek operation, and decreasing a proportion of the retardation current in the drive current if the velocity of the head at the intended position was negative in the previous seek operation, wherein positive velocity is a velocity at a first seek operation and negative velocity is velocity with an opposite direction to positive velocity.

6. A method for positioning a head attached to an actuator at an intended position on a disk, comprising:

calculating a drive current, which when applied to the actuator, causes the actuator to move the head to the intended position;

adjusting the calculated drive current based on a speed of the head, and a difference between a true position of the head and the intended position during a previous seek operation; and moving the actuator based on the adjusted drive current so as to move the head to the intended position wherein:

the drive current includes a saturation velocity current that drives the actuator with a saturation velocity, and a retardation current that retards the actuator, and if the difference between the true position of the head and the intended position during the previous seek operation was greater than a threshold value, the adjusting includes adjusting the calculated drive current so as to shorten a driving period by a predetermined duration for driving the actuator with the saturation velocity current if the head had crossed the intended position in the previous seek operation, and adjusting the calculated drive current so as to prolong the driving period by a predetermined duration for driving the actuator with the saturation velocity current if the head had fallen short of the intended position in the previous seek operation, wherein the driving period is a duration for which the drive current drives the actuator.

* * * * *